United States Patent
Shimoyama et al.

(10) Patent No.: US 9,370,967 B2
(45) Date of Patent: Jun. 21, 2016

(54) WHEEL REACTION FORCE DETECTING APPARATUS

(71) Applicant: Fuji Jukogyo Kabushiki Kaisha, Tokyo (JP)

(72) Inventors: Hiroshi Shimoyama, Tokyo (JP); Hiroki Nagano, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/272,294

(22) Filed: May 7, 2014

(65) Prior Publication Data
US 2014/0331790 A1    Nov. 13, 2014

(30) Foreign Application Priority Data

May 8, 2013   (JP) .................................. 2013-098598

(51) Int. Cl.
*B60B 27/00*    (2006.01)
*F16C 25/08*    (2006.01)
(Continued)

(52) U.S. Cl.
CPC ......... *B60B 27/0068* (2013.01); *B60B 27/0078* (2013.01); *B60B 27/0005* (2013.01); *B60B 2900/321* (2013.01); *B60B 2900/323* (2013.01); *B60B 2900/325* (2013.01); *B60G 2204/115* (2013.01); *B60G 2204/116* (2013.01);
(Continued)

(58) Field of Classification Search
CPC ............ B60B 27/0068; B60B 27/0078; B60B 27/0005; B60B 2900/321; B60B 2900/323; B60B 2900/325; B60B 27/001; B60B 3/087; F16C 35/077; F16C 25/08

USPC ...................... 73/862.541; 384/585, 587, 589
See application file for complete search history.

(56) References Cited

U.S. PATENT DOCUMENTS

| | | | | |
|---|---|---|---|---|
| 3,481,655 A | * | 12/1969 | Campbell | F16C 35/077 384/536 |
| 3,918,779 A | * | 11/1975 | Halliger | F16C 35/07 384/538 |
| 5,010,290 A | * | 4/1991 | Foster | F16C 41/04 324/173 |

(Continued)

FOREIGN PATENT DOCUMENTS

DE    102010011461 A1 *  9/2011
JP    2006-226683 A    8/2006

OTHER PUBLICATIONS

Translation of DE 102010011461: "English Translation of DE 102010011461".pdf.*

*Primary Examiner* — Lisa Caputo
*Assistant Examiner* — Tran M Tran
(74) *Attorney, Agent, or Firm* — McGinn IP Law Group PLLC

(57) ABSTRACT

A wheel reaction force detecting apparatus includes a mount fixed to a suspension device, a hub to which a wheel is fixed, a sensing unit including a cylinder disposed inside the hub and substantially coaxial with an axle of the wheel, and a component force detector to detect a component force on the wheel. The hub is rotatably supported around the axle with respect to the mount. The cylinder has a first end fixed to the mount and a second end connected to the hub with a hub bearing disposed therebetween. The component force detector is disposed on the cylinder in the sensing unit. The hub bearing includes an inner race fit on a sensitive unit and an outer race fit on the hub. A position of the outer race is adjustable in an axial direction of the axle with respect to the inner race.

7 Claims, 3 Drawing Sheets

(51) Int. Cl.
   *G01L 1/22* (2006.01)
   *F16C 35/077* (2006.01)
(52) U.S. Cl.
   CPC .............. *F16C25/08* (2013.01); *F16C 35/077* (2013.01); *G01L 1/22* (2013.01); *G01L 1/2218* (2013.01)

(56) References Cited

U.S. PATENT DOCUMENTS

| | | | | |
|---|---|---|---|---|
| 5,424,635 A * | | 6/1995 | Robinson | G01P 3/487 324/168 |
| 5,492,417 A * | | 2/1996 | Baker | B60B 27/0005 384/448 |
| 5,517,858 A * | | 5/1996 | Matsuzaki | F16C 19/522 73/593 |
| 5,564,995 A * | | 10/1996 | Roder | F16C 35/073 384/539 |
| 5,591,921 A * | | 1/1997 | Schaede | B41F 33/00 73/849 |
| 5,864,056 A * | | 1/1999 | Bell | B60C 11/24 73/146 |
| 5,877,433 A * | | 3/1999 | Matsuzaki | F16C 19/186 73/862.01 |
| 6,217,220 B1 * | | 4/2001 | Ohkuma | B60B 27/00 301/108.1 |
| 6,340,210 B1 * | | 1/2002 | Handa | B60B 3/002 301/64.303 |
| 6,471,407 B1 * | | 10/2002 | Katano | B60B 7/0005 384/448 |
| 6,679,633 B2 * | | 1/2004 | Chambert | G01P 3/443 324/207.25 |
| 7,197,944 B2 * | | 4/2007 | Koyagi | B60B 27/00 73/862.322 |
| 7,212,927 B2 * | | 5/2007 | Yanagisawa | F16C 19/186 702/41 |
| 7,245,123 B2 * | | 7/2007 | Inoue | B60B 27/00 324/166 |
| 7,287,909 B2 * | | 10/2007 | Sakamoto | B60B 27/00 384/482 |
| 7,320,256 B2 * | | 1/2008 | Ono | F16C 19/186 73/862.322 |
| 7,320,257 B2 * | | 1/2008 | Takizawa | B60B 27/00 73/862.322 |
| 7,359,787 B2 * | | 4/2008 | Ono | B60G 17/016 180/197 |
| 7,534,046 B2 * | | 5/2009 | Yamamoto | B60B 27/00 324/207.25 |
| 7,557,569 B2 * | | 7/2009 | Ono | B60B 27/0005 324/207.25 |
| 7,604,413 B2 * | | 10/2009 | Koike | G01L 5/0023 324/173 |
| 7,628,540 B2 * | | 12/2009 | Iwamoto | B60B 27/0005 384/448 |
| 7,686,516 B2 * | | 3/2010 | Shibasaki | F16C 19/186 324/207.25 |
| 7,733,083 B2 * | | 6/2010 | Ozaki | B60B 27/0005 324/173 |
| 7,762,128 B2 * | | 7/2010 | Ozaki | B60B 27/00 73/115.07 |
| 7,780,358 B2 * | | 8/2010 | Ozaki | B60B 27/0005 384/448 |
| 7,856,893 B2 * | | 12/2010 | Ozaki | B60B 27/00 73/862.321 |
| 7,874,734 B2 * | | 1/2011 | Komori | B60B 27/0005 29/898.062 |
| 7,882,752 B2 * | | 2/2011 | Ozaki | B60B 27/0005 73/862.322 |
| 7,908,974 B2 * | | 3/2011 | Hewitt | B61F 5/30 105/198.2 |
| 7,988,363 B2 * | | 8/2011 | Takahashi | F16C 33/723 324/173 |
| 7,997,154 B2 * | | 8/2011 | Oguma | F16C 19/186 73/862.541 |
| 8,021,052 B2 * | | 9/2011 | Ozaki | B60B 27/00 324/207.13 |
| 8,215,846 B2 * | | 7/2012 | Hirai | B60B 27/0005 384/544 |
| 8,303,188 B2 * | | 11/2012 | Otsuka | F16C 25/08 384/537 |
| 8,360,649 B2 * | | 1/2013 | Norimatsu | B60B 27/0005 384/448 |
| 8,439,568 B2 * | | 5/2013 | Ozaki | B60B 27/0005 384/446 |
| 8,444,323 B2 * | | 5/2013 | Bostwick | H02K 5/1732 384/585 |
| 8,459,875 B2 * | | 6/2013 | Otsuka | F16C 25/08 384/537 |
| 8,678,662 B2 * | | 3/2014 | Tajima | B60B 27/00 384/537 |
| 8,740,468 B2 * | | 6/2014 | Sutherlin | F16C 19/186 384/544 |
| 8,864,382 B2 * | | 10/2014 | Ono | B60B 27/0068 384/448 |
| 8,960,011 B2 * | | 2/2015 | Nagano | G01L 1/005 73/760 |
| 9,097,284 B2 * | | 8/2015 | Ohtsuki | B60B 27/0005 |
| 2004/0100057 A1 * | | 5/2004 | Nicot | B60G 17/019 280/93.5 |
| 2006/0037411 A1 * | | 2/2006 | Hofmann | G01L 5/0019 73/862.541 |
| 2006/0153482 A1 * | | 7/2006 | Koike | B60B 3/02 384/448 |
| 2007/0058892 A1 * | | 3/2007 | Motohashi | B60B 27/0005 384/448 |
| 2007/0157742 A1 * | | 7/2007 | Kouduki | B60B 27/00 73/862.541 |
| 2008/0018169 A1 * | | 1/2008 | Yeh | B60B 3/087 301/64.301 |
| 2008/0144985 A1 * | | 6/2008 | Joki | B60B 3/04 384/448 |
| 2009/0220183 A1 * | | 9/2009 | Meeker | B60B 27/0005 384/544 |
| 2009/0229379 A1 * | | 9/2009 | Ozaki | B60B 27/0005 73/862.69 |
| 2010/0316319 A1 * | | 12/2010 | Hirai | B60B 27/0005 384/490 |
| 2010/0326209 A1 * | | 12/2010 | Walter | G01M 9/04 73/862.541 |
| 2011/0125421 A1 * | | 5/2011 | Takahashi | B60B 27/0005 702/42 |
| 2013/0049445 A1 * | | 2/2013 | Kitamura | B60B 27/0068 301/110.5 |
| 2013/0249273 A1 * | | 9/2013 | Norimatsu | B60B 27/0068 301/109 |
| 2014/0047928 A1 * | | 2/2014 | Bao | G01L 5/00 73/862.541 |
| 2014/0202262 A1 * | | 7/2014 | Mercat | B60B 27/023 73/862.338 |
| 2014/0212081 A1 * | | 7/2014 | Takahashi | B60B 27/0068 384/448 |
| 2015/0010260 A1 * | | 1/2015 | Meeker | B60B 27/001 384/544 |

\* cited by examiner

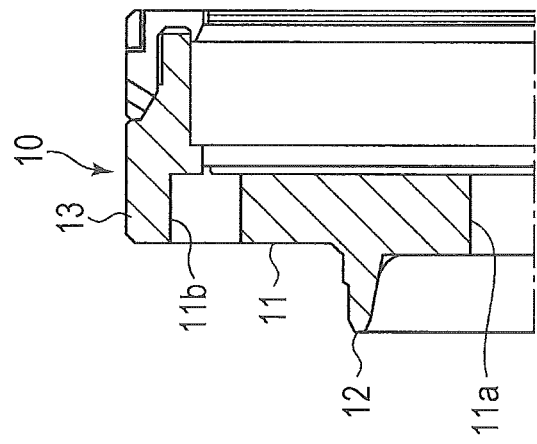
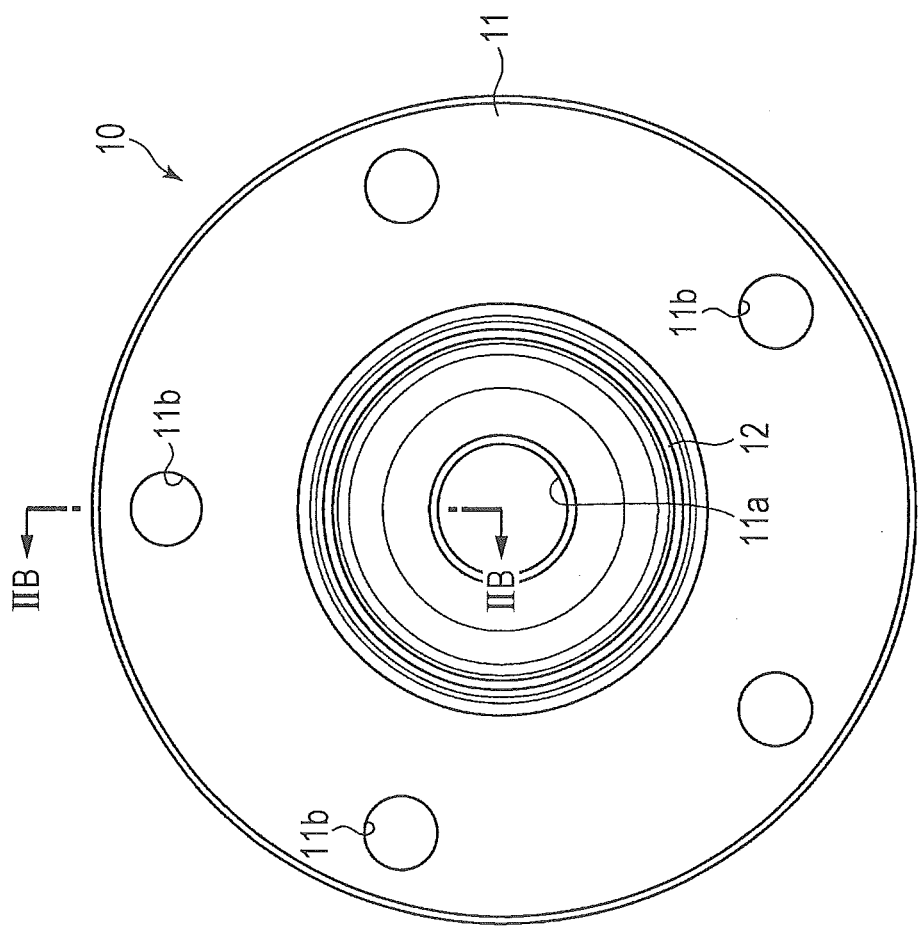

:

WHEEL REACTION FORCE DETECTING APPARATUS

CROSS-REFERENCE TO RELATED APPLICATIONS

The present application claims priority from Japanese Patent Application No. 2013-098598 filed on May 8, 2013, the entire contents of which are hereby incorporated by reference.

BACKGROUND

1. Technical Field

The present invention relates to a wheel reaction force detecting apparatus capable of detecting a reaction force on a wheel fixed to a hub rotatably supported through a hub bearing.

2. Related Art

Various types of information are needed to control recent cars, and a sensor device disposed on a hub to which a wheel is fixed, the hub being rotatably supported through a hub bearing, is proposed (see Japanese Unexamined Patent Application Publication (JP-A) No. 2006-226683). The sensor device described in JP-A No. 2006-226683 includes a load sensor for detecting a reaction force on a wheel, a shim member, and a sensor holding member. The load sensor is disposed inside an axial through hole in a flange in a vehicle-body track member fixed on a vehicle body, the shim member is disposed between the load sensor and the inner surface of the axial through hole, and the sensor holding member is disposed between the load sensor and the outer surface of the axial through hole. Preload on the load sensor is adjustable by changing the thickness of the shim member.

In the hub equipped with the known sensor device, the inner race is rotatably disposed inside the track member through balls (rolling elements), an inner shaft is disposed inside the inner race, the flange is disposed on a second end of the inner shaft, and the wheel is fixed to the flange.

The inner race in the hub equipped with the known sensor device is fixed by a nut screwed to an end of the inner shaft. If the nut is loosened, play of the balls (rolling elements) sandwiched between the vehicle-body track member and the inner race is increased. That may degrade the accuracy of detecting a wheel reaction force on the wheel by the load sensor. If the stiffness of the bearing including the inner race, balls, and track member decreases due to age, the accuracy of detecting a wheel reaction force by the load sensor may also be degraded.

SUMMARY OF THE INVENTION

Accordingly, it is an object of the present invention to provide a wheel reaction force detecting apparatus capable of preventing a decrease in the accuracy of detecting a wheel reaction force even if play of balls in a bearing on a hub is increased or the stiffness of the bearing is decreased.

An aspect of the present invention provides wheel reaction force detecting apparatus includes a mount, a hub to which a wheel is fixed, a sensing unit, and a component force detector. The mount is fixed to a suspension device. The hub is rotatably supported around an axle of the wheel with respect to the mount. The sensing unit includes a cylinder disposed inside the hub and substantially coaxial with the axle. The cylinder has a first end fixed to the mount and a second end connected to the hub with a hub bearing disposed therebetween. The component force detector is configured to detect a component force on the wheel, the component force detector being disposed on the cylinder in the sensing unit. The hub bearing includes an inner race connected to the sensing unit and an outer race being in contact with the hub. A position of the outer race is adjustable in an axial direction of the axle with respect to the inner race.

The outer race in the hub bearing is movably fit in a receiving recession, and the receiving recession may be disposed inside the hub and substantially coaxial with the axle. The hub may have an end opposite to the axle and may include a bearing pushing member screwed to an outer periphery of the end. The bearing pushing member may be capable of moving closer to and away from the hub bearing fit in the receiving recession. The bearing pushing member may include a pressing protrusion extending over the end of the hub toward the receiving recession and projecting toward the outer race in the hub bearing.

BRIEF DESCRIPTION OF THE DRAWINGS

FIGS. 2A and 2B illustrate a hub, FIG. 2A is a side view of the hub, and FIG. 2B is a partial cross-sectional view that illustrates a portion taken along section line IIB-IIB of FIG. 2A.

DETAILED DESCRIPTION

A wheel reaction force detecting apparatus according to an implementation of the present invention is described below with reference to FIGS. 1 to 3. In this implementation, the wheel reaction force detecting apparatus including a hub is described. The hub is fixed to an upright (housing) supported on an end of a suspension arm swinging with respect to a body in a vehicle, such as a car, and the hub supports a wheel including a tire and a rim while allowing rotation of the wheel.

Figure 1:
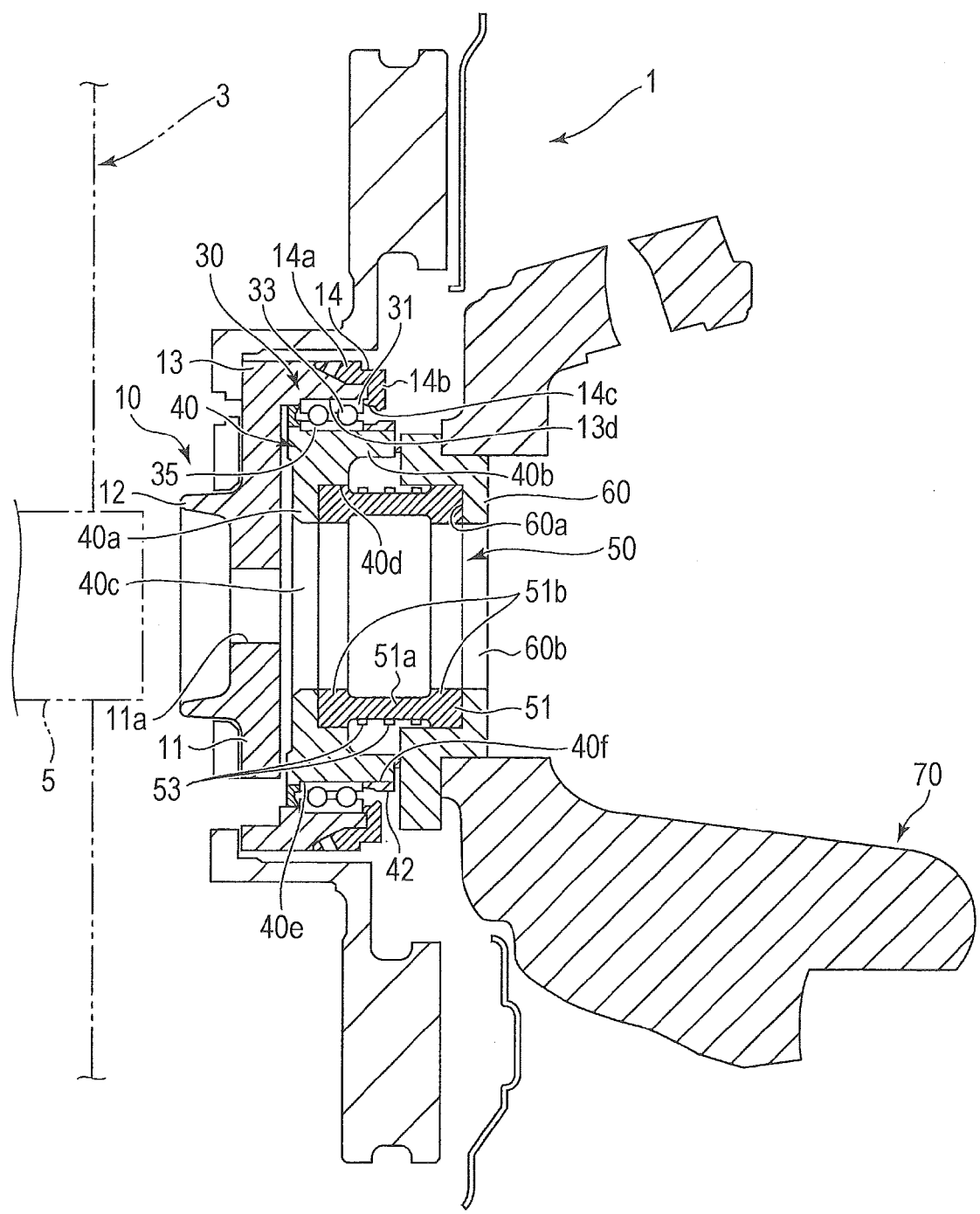
FIG. 1 is a cross-sectional view of a wheel reaction force detecting apparatus according to an implementation of the present invention.

As illustrated in FIG. 1 (cross-sectional view), a wheel reaction force detecting apparatus 1 includes a hub 10, a hub bearing 30 disposed in the hub 10, a sensitive unit 40 disposed inside the hub bearing 30, and a component force detecting device 50 for detecting a component force on a wheel 3. First, the hub 10 is described.

The hub 10 includes a disk 11, a cylindrical central portion 12 projecting from a first surface of the disk 11, an annular outer cylinder 13 projecting from the outer edge of the disk 11 toward another direction, and a bearing pushing member 14 movable in a vehicle wide direction with respect to the outer cylinder 13.

As illustrated in FIGS. 1, 2A, and 2B, the disk 11 has a hole 11a in its central portion and is substantially coaxial with an axle 5. The disk 11 has a plurality of openings 11b in its outer end in a radial direction in its external side in the vehicle wide direction. The openings 11b are spaced at predetermined intervals in a circumferential direction and allow hub bolts (not illustrated) to be inserted therethrough. The wheel 3 is secured to the disk 11 with the hub bolts disposed therebetween. The central portion 12 has an annular shape whose center is the axial center of the disk 11. The central portion 12 is inserted into a recession in a rim of the wheel 3 and guides the hub 10 to enable the wheel 3 and the hub 10 to be coaxial with each other at the time of attaching the wheel.

Figure 3:
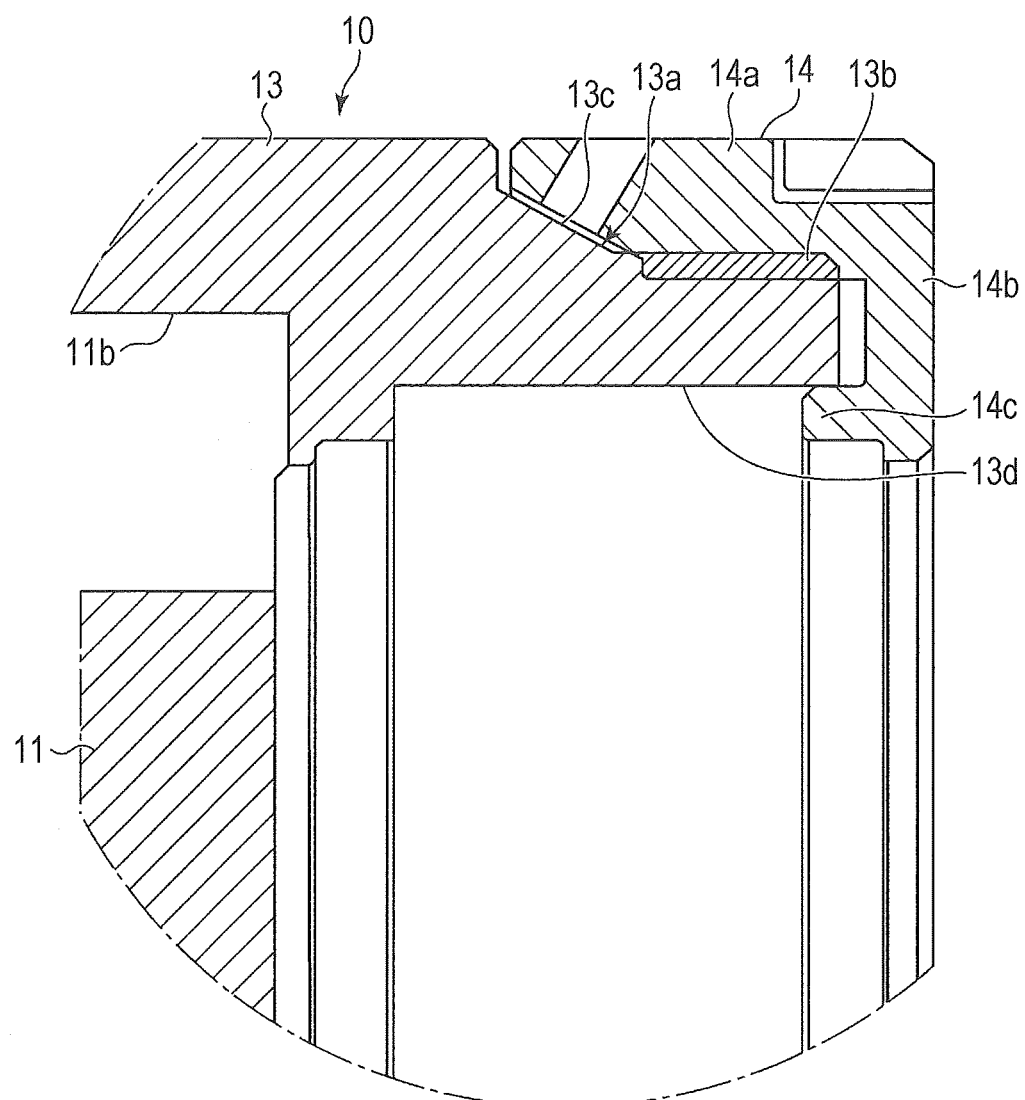
FIG. 3 is a partial enlarged view of the portion illustrated in FIG. 2B.

As illustrated in FIG. 3 (enlarged view), the outer cylinder 13 has an annular step 13a in its outer end in the radial direction in its internal portion in the vehicle width direction. The step 13a is cut inward. A male thread unit 13b is disposed in a surface of the step 13a and extends in the vehicle width direction. A slope 13c is disposed on an external end in the vehicle width direction of the external thread unit 13b and is inclined outward in the radial direction toward the outer direction. The bearing pushing member 14 is screwed to the external thread unit 13b. As illustrated in FIGS. 1 and 3, the outer cylinder 13 has a receiving recession 13d in its inner region. The receiving recession 13d allows an outer race 31 in the hub bearing 30 to be fit therein. The inside diameter of the receiving recession 13d has dimensions at which the fit outer race 31 can slide in the receiving recession 13d. The central axis of the receiving recession 13d is substantially coaxial with the central axis line of the disk 11.

The bearing pushing member 14 is an annular member screwed to the external thread unit 13b in the outer cylinder 13 and movable in the vehicle width direction with respect to the outer cylinder 13. The bearing pushing member 14 includes a pushing main body 14a screwed to the male thread unit 13b, an arm 14b extending from the internal end in the vehicle width direction of the pushing main body 14a over the end of the outer cylinder 13 toward the receiving recession 13d, and a pressing protrusion 14c disposed on an end of the arm 14b, the end being adjacent to the external thread unit 13b. The pressing protrusion 14c projects toward the outer race 31 in the hub bearing 30. When the bearing pushing member 14 is rotated such that the bearing pushing member 14 is moved outward in the vehicle width direction with respect to the outer cylinder 13, the pressing protrusion 14c comes into contact with the side surface of the outer race 31 in the hub bearing 30, thus enabling the outer race 31 to be moved outward in the vehicle width direction with respect to an inner race 35 in the hub bearing 30.

The hub bearing 30 fit on the outer cylinder 13 supports the hub 10 such that the hub 10 can rotate about the axle. An example of the hub bearing 30 is a deep-groove radial bearing. The hub bearing 30 includes the outer race 31, the inner race 35, and steel balls 33. The outer race 31 has a track surface in its inner portion. The inner race 35 is disposed inside the outer race 31 and has a track surface in its outer portion. The steel balls 33 function as rolling elements sandwiched between the outer race 31 and the inner race 35. The outer race 31 is rotatable in the circumferential direction with respect to the inner race 35 and movable in the width direction with respect to the inner race 35. When the outer race 31 is pushed in the width direction of the outer race by the above-described bearing pushing member 14, the outer race 31 can be moved with respect to the inner race 35, and the stiffness of the hub bearing 30 can be increased.

The sensitive unit 40 is disposed inside the inner race 35 in the hub bearing 30. The sensitive unit 40 is in contact with the inner race 35 and fixes the inner race 35. The sensitive unit 40 includes a disk 40a, an outer cylinder 40b on an outer end in the radial direction of the disk 40a, and an inner-race fixing ring 42 attached on the outer cylinder 40b.

The disk 40a is a plate member whose axial center is substantially coaxial with the axial center of the hub 10. The disk 40a has a hole 40c in its central portion. The disk 40a has an accommodating recession 40d in its inner edge of the disk 40a. The accommodating recession 40d is used for securing a first end of a sensing unit 51. The sensing unit 51 is a part of the component force detecting device 50.

The outer cylinder 40b has a cylindrical shape extending inward in the vehicle width direction from the outer edge of the disk 40a. The central axis line of the outer cylinder 40b is substantially coaxial with that of the hub 10. A step 40e is disposed on the outer periphery of the outer cylinder 40b. The inner race 35 is positioned by the external end in the vehicle width direction of the inner race 35 being contact with the stepped portion in the step 40e. A male thread unit 40f is disposed in an internal end in the vehicle width direction in the outer periphery of the step 40e. The inner-race fixing ring 42 is screwed to the external thread unit 40f.

The inner-race fixing ring 42 includes a female thread unit in its inner surface. The internal thread unit can be screwed to the external thread unit 40f in the step 40e. The inner-race fixing ring 42 can be screwed to the step 40e and is movable in the vehicle width direction with respect to the outer cylinder 40b. Accordingly, the internal portion of the inner race 35 in the vehicle width direction can be positioned by causing the inner-race fixing ring 42 to come into contact with the internal side surface of the inner race 35 fit on the outer periphery of the step 40e on the outer cylinder 40b, and the inner race 35 can be fixed to the sensitive unit 40 together with the stepped portion of the step 40e.

A mount 60 is disposed inside the sensitive unit 40 in the vehicle width direction. The mount 60 is an annular member connected with a suspension device 70. The mount 60 has an accommodating recession 60a in its external region in the vehicle width direction. The accommodating recession 60a is used for securing a second end of the sensing unit 51, which is a part of the component force detecting device 50. The mount 60 has a through hole 60b in its central portion.

The component force detecting device 50 includes the cylindrical sensing unit 51 and a plurality of strain gages 53 disposed on the circumferential surface of the sensing unit 51. The sensing unit 51 includes a cylinder 51a and annular flanges 51b disposed on both ends in the axial direction. The flanges 51b extend outward in the radial direction. The plurality of strain gages 53 are classified into an Fx detection system for detecting a force in a radial direction (hereinafter referred to as "x-axis direction") with respect to the cylinder 51a, an Fy detection system for detecting a force in a vertical radial direction perpendicular to the x-axis direction (hereinafter referred to as "y-axis direction") with respect to the cylinder 51a, an Fz detection system for detecting a force in an axial direction (hereinafter referred to as "z-axis direction") with respect to the cylinder 51a, an Mx detection system for detecting a moment Mx about the x-axis with respect to the cylinder 51a, an My detection system for detecting a moment My about the y-axis with respect to the cylinder 51a, and an Mz detection system for detecting a moment Mz about the z-axis with respect to the cylinder 51a. Accordingly, a force on the wheel 3 can be detected in at least one of the above-described detection systems by the use of the plurality of strain gages 53.

Next, actions of the wheel reaction force detecting apparatus 1 are described with reference to FIG. 1. As illustrated in FIG. 1, when a reaction force acts on the wheel 3, the reaction force is transmitted to the hub 10 through the axle 5. The reaction force transmitted to the hub 10 is transmitted to the sensing unit 51 through the hub bearing 30 and the sensitive unit 40, and it deforms the sensing unit 51. The amount of the deformation in the sensing unit 51 is converted into a voltage value by the plurality of strain gages 53 on the sensing unit 51, and the reaction force transmitted to the hub 10 is detected.

If the stiffness of the hub bearing 30 decreases due to age or other factor, the magnitude of a reaction force transmitted from the hub 10 through the hub bearing 30 may vary. If the magnitude of the reaction force varies, it is difficult to accurately detect the reaction force. In such a case, the wheel reaction force detecting apparatus 1 according to the present invention can move the outer race 31 with respect to the inner race 35 in the hub bearing 30 by the use of the bearing pushing member 14. Thus the stiffness of the hub bearing 30 can be restored to its original state. Accordingly, even if the stiffness of the hub bearing 30 decreases, it is possible to prevent degradation in the accuracy of detecting a tire reaction force.

The invention claimed is:

1. A wheel reaction force detecting apparatus comprising:
a mount fixed to a suspension device;
a hub to which a wheel is fixed, the hub being rotatably supported around an axle of the wheel with respect to the mount;
a sensing unit including a cylinder, the cylinder being disposed inside the hub and substantially coaxial with the axle, the cylinder having a first end fixed to the mount and a second end connected to the hub with a hub bearing disposed between the cylinder and the hub in a radial direction; and
a component force detector to detect a component force on the wheel, the component force detector being disposed on the cylinder in the sensing unit,
wherein the hub bearing includes an inner race connected to the sensing unit and an outer race being in contact with the hub, and a position of the outer race is adjustable in an axial direction of the axle with respect to the inner race, and
wherein the hub includes an annular outer cylinder, the annular outer cylinder comprising:
an annular step portion in an outer end in the radial direction, the step portion being cut inward in a vehicle width direction and including a threaded portion;
a receiving recession in an inner end in the radial direction for accommodating the inner race and the outer race of the hub bearing; and
a bearing pushing member attached to the threaded portion of the step portion so as to be movable in the vehicle width direction.

2. The wheel reaction force detecting apparatus according to claim 1, wherein
the outer race in the hub bearing is movably fit in a receiving recession, the receiving recession is disposed inside the hub and substantially coaxial with the axle;
the hub has an end opposite to the axle and includes a bearing pushing member screwed to an outer periphery of the end, the bearing pushing member is capable of moving closer to and away from the hub bearing fit in the receiving recession; and
the bearing pushing member includes a pressing protrusion extending over the end of the hub toward the receiving recession and projecting toward the outer race in the hub bearing.

3. The wheel reaction force detecting apparatus according to claim 2, wherein the pressing protrusion contacts the outer race.

4. The wheel reaction force detecting apparatus according to claim 1, wherein the sensing unit is fixed to the inner race.

5. The wheel reaction force detecting apparatus according to claim 1, wherein the sensing unit is disposed inside the inner race in the radial direction.

6. The wheel reaction force detecting apparatus according to claim 1, wherein the hub further includes a bearing pushing member that is movable toward and away from the hub bearing, the bearing pushing member including:
an arm extending in the radial direction towards the hub bearing; and
a pressing protrusion disposed on an end of the arm so as to contact the outer race.

7. A wheel reaction force detecting apparatus comprising:
a mount fixed to a suspension device;
a hub to which a wheel is fixed, the hub being rotatably supported around an axle of the wheel with respect to the mount;
a sensing unit including a cylinder, the cylinder being disposed inside the hub and substantially coaxial with the axle, the cylinder having a first end fixed to the mount and a second end connected to the hub with a hub bearing disposed between the cylinder and the hub in a radial direction; and
a component force detector to detect a component force on the wheel, the component force detector being disposed on the cylinder in the sensing unit,
wherein the hub bearing includes an inner race connected to the sensing unit and an outer race being in contact with the hub, and a position of the outer race is adjustable in an axial direction of the axle with respect to the inner race, and
wherein the hub includes:
a disk;
a cylindrical central portion projecting from a first surface of the disk;
an outer cylinder projecting from the outer edge of the disk; and
a bearing pushing member movable in a vehicle wide direction with respect to the outer cylinder.

* * * * *